United States Patent [19]

Setani

[11] Patent Number: 4,963,464

[45] Date of Patent: Oct. 16, 1990

[54] OPTICAL MEDIUM HAVING PITS OF DIFFERENT DEPTHS, AND METHOD AND APPARATUS FOR REPRODUCING INFORMATION THEREFROM

[75] Inventor: Michitaka Setani, Kawasaki, Japan

[73] Assignee: Canon Kabushiki Kaisha, Tokyo, Japan

[21] Appl. No.: 212,653

[22] Filed: Jun. 28, 1988

[30] Foreign Application Priority Data

Jul. 1, 1987 [JP] Japan ................................ 62-162494

[51] Int. Cl.$^5$ ............................ G03C 1/00; G11B 5/09
[52] U.S. Cl. .................................... 430/495; 430/945; 369/48; 369/109
[58] Field of Search .......................... 369/284, 48, 109; 346/76 L, 135.1, 137; 428/64, 65, 913; 430/945, 321, 495

[56] References Cited

U.S. PATENT DOCUMENTS

| | | | |
|---|---|---|---|
| 4,041,530 | 8/1977 | Kramer et al. | 369/275 |
| 4,322,839 | 3/1982 | Yamashita et al. | 369/284 |
| 4,428,873 | 1/1984 | Murayama et al. | 252/583 |
| 4,499,574 | 2/1985 | Braat | 369/275 |
| 4,556,967 | 12/1985 | Braat | 369/275 |
| 4,717,508 | 1/1988 | DeMartino | 252/583 |

Primary Examiner—Patrick Ryan
Attorney, Agent, or Firm—Fitzpatrick, Cella, Harper & Scinto

[57] ABSTRACT

An optical information recording medium includes a plurality of kinds of pits independently representing information and having different depths, wherein the plurality of kinds of pits are formed as portions recessed from the same plane. A method of reproducing information is disclosed, which includes irradiating this medium with a plurality of light beams having different wavelengths corresponding to the depths of the plurality of kinds of pits; and independently detecting the beams modulated by the pits. An optical information reproducing apparatus is also disclosed. The reproducing apparatus includes an optical information recording medium having a plurality of kinds of pits formed in the same plane, each pit independently representing information and having an independently determined depth; an irridating device for irradiating the medium with a plurality of light beams having different wavelengths corresponding to the depths of the plurality of kinds of pits; and a plurality of photodetectors for indepedently detecting a plurality of light beams modulated by the pits.

9 Claims, 4 Drawing Sheets

OPTICAL MEDIUM HAVING PITS OF DIFFERENT DEPTHS, AND METHOD AND APPARATUS FOR REPRODUCING INFORMATION THEREFROM

BACKGROUND OF THE INVENTION

1. Field of the Invention

The present invention relates to an optical recording medium in which information is recorded in the form of pits, a method of reproducing the information from this medium, and an optical information reproducing apparatus such as an optical disk apparatus and an optical card apparatus using this method.

2. Description of the Related Art

An optical disk reproducing apparatus is adapted to read and reproduce information recorded along tracks formed spirally or concentrically on a rotating optical disk upon irradiation by a laser beam thereof, and can be used as an information memory of very large capacity. The recorded information will have been recorded in the form of recesses called pits in correspondence with modulated signals which are normally digitally converted. Reproduction is effected by irradiating the disk with the laser beam and detecting a difference in the quantity of reflected or transmitted light which varies in accordance with the presence or absence of the pits. Such optical information recording media can be broadly classified into three different types: those used exclusively for reading, those which can be written on only once (referred to as the additional writing type), and those which can be overwritten.

The information which is generally recorded in the above-described optical information recording media includes, for instance, audio information or video information, or both. In any case, the information recorded on the disk employs one system of signal rows. For instance, U. S. Pat. No. 4,041,530 (issued on Aug. 9, 1977) discloses a recording medium which has pits with a depth of $\lambda/4$ with respect to the reproducing light having a wavelength $\lambda$. Such a medium has naturally been subject to restrictions in the beam width and the like of recording signals owing to restrictions in the recording density, transfer rate, etc.

In addition, in order to increase the amount of information recorded on the optical recording medium, the intervals between the recording pits on the recording medium may be narrowed. As a practical matter, however, there arises the problem of information being mixed in from adjacent tracks (i.e., crosstalk) during reproduction, which disadvantageously limits the recording density.

SUMMARY OF THE INVENTION

Accordingly an object of the present invention is to provide an optical recording medium which is capable of increasing the amount of information recorded without any occurrence of crosstalk as well as a method of and apparatus for reproducing information using said medium, thereby overcoming the above-described drawbacks of the prior art.

To this end, according to the present invention, there is provided an optical information recording medium comprising a substrate having a plurality of kinds of pits independently representing information, each kind of pit having a different depth, wherein the plurality of kinds of pits are formed as portions recessed from the same plane. To reproduce information from this medium, it suffices if this medium is irradiated with a plurality of light beams having different wavelengths corresponding to the depths of the plurality of kinds of pits, and if the beams modulated by the pits are detected independently. Accordingly, an optical information reproducing apparatus comprises an optical information recording medium having a plurality of kinds of pits formed in the same plane, each pit independently representing information and having an independently determined depth; means for irradiating the medium with a plurality of light beams having different wavelengths corresponding to the depths of the plurality of kinds of pits; and a plurality of photodetectors for independently detecting a plurality of light beams modulated by the pits.

The above and other objects, features and advantages of the present invention will become more apparent from the following description of the invention when read in conjunction with the accompanying drawings.

DESCRIPTION OF THE PREFERRED EMBODIMENTS

Referring now to the accompanying drawings, preferred embodiments of the present invention will be described in detail.

First, a description will be given of an optical information reproducing apparatus in accordance with the present invention.

Figure 1:
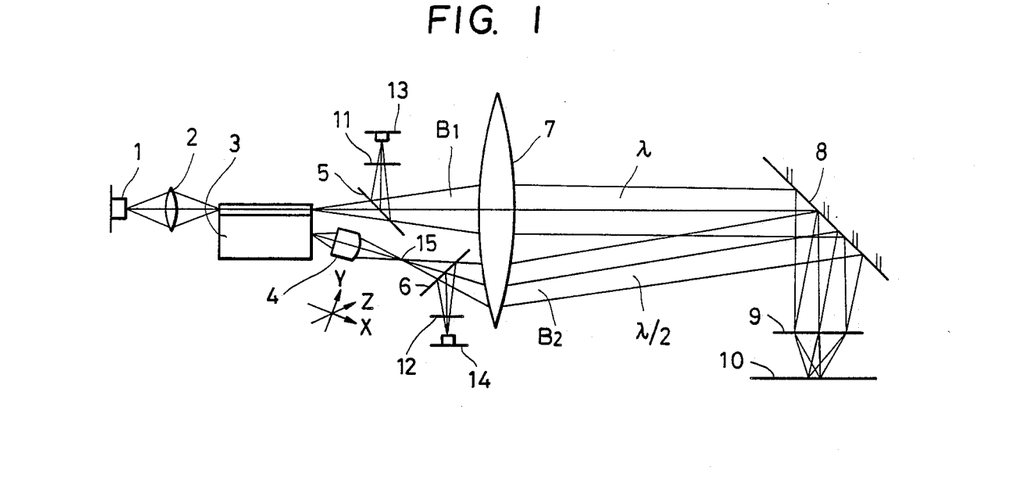
FIG. 1 is a schematic diagram illustrating an embodiment of an optical information reproducing apparatus in accordance with the present invention.

FIG. 1 is a schematic diagram of the optical information reproducing apparatus to which a method of optical reproduction of the present invention can be suitably applied.

Figure 2A:
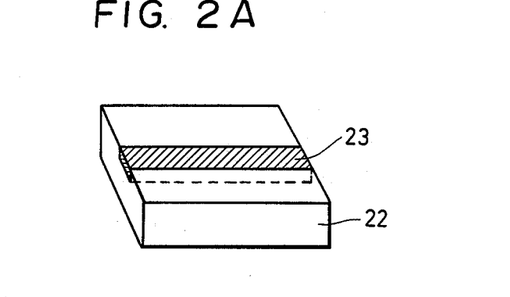
FIGS. 2A and 2B are, respectively, perspective and cross-sectional views illustrating a waveguide-type secondary harmonic oscillator shown in FIG. 1.
Figure 2B:
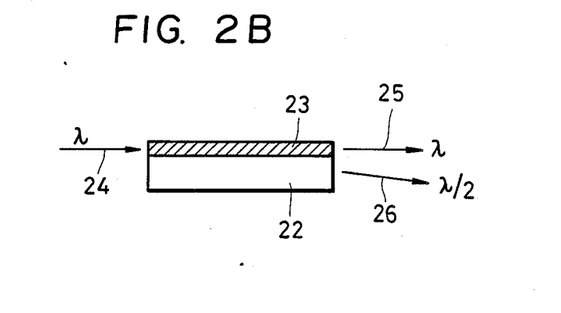

In FIG. 1, reference numeral 1 denotes a semiconductor laser constituting a light source, reference numeral 2 denotes a coupling lens which is adapted to efficiently introduce the light emergent from the semiconductor laser 1 into a waveguide portion of a waveguide-type optical secondary harmonic oscillator 3. The secondary harmonic oscillator 3 is adapted to generate, as secondary waves, light waves whose wavelengths are half those of the incident light, by making use of a nonlinear optical effect. A harmonic oscillator of this type is described, for example, in U.S. Pat. Nos. 4,428,873 and 4,717,508. Briefly, such a device is shown in FIGS. 2A and 2B, which are respectively perspective and cross-sectional views of the waveguide-type secondary harmonic oscillator 3. Specifically, this secondary harmonic oscillator 3 is arranged in such a way that a waveguide 23 for enclosing the incident light by a proton conversion method is formed on an LiNbO$_3$ substrate 22 which has a large electro-optical effect. As a secondary harmonic is emitted from the waveguide 23 into the substrate 22, a light wave 26 whose wavelength is half that of incident light 24 is emitted efficiently. Incidentally, in the example of FIG. 2, the incident light 24 which has passed the waveguide 23 emerges from an end portion thereof on the opposite side as a light wave 25 whose wavelength remains the same as that at the time of incidence.

In FIG. 1, B1 denotes a light beam which is emitted from the waveguide-type secondary harmonic oscillator 3, while B2 denotes a light beam having a half-wavelength as a result of the generation of a secondary harmonic and indicated by the light wave 26 in FIG. 2. Reference numeral 4 denotes an optical device for compensating the aberration of the light beam B2, while numeral 15 denotes a focal point of the optical device 4.

A half mirror 5 is provided in correspondence with the light beam B1 emitted from the waveguide-type secondary harmonic oscillator 3 and having a first wavelength. Similarly, a half mirror 6 is provided in correspondence with the light beam B2 having a second wavelength. A collimator lens 7 converts the respective light beams B1, B2 into parallel beams. A mirror 8 reflects the light beams B1, B2 in the direction of an optical recording medium 10. An objective lens 9 converges the light beams reflected by the mirror 8 onto predetermined positions on the optical recording medium 10.

The optical recording medium 10 reflects the light beams B1 and B2 after imparting a modulation effect, to be described below. The reflected, modulated light beam B1 is passed back through objective lens 9, along the original path of light beam B1, and is reflected by mirror 8 through collimator lens 7. Half mirror 5 reflects the modulated light beam B1 onto photodetector 13 through filter 11.

Similarly, modulated, reflected light beam B2 travels back along its original path through objective lens 9, is reflected by mirror 8 through collimator lens 7, and reflected by half-mirror 6 onto photodetector 14 through filter 12.

A photodetector 13 is adapted to detect signals of the light beam B1 reflected from the recording medium 10. A photodetector 14 is likewise adapted to detect signals of the similarly reflected light beam B2. Filters 11, 12 are respectively disposed in front of the photodetectors 13, 14 and are used for preventing the mixing in of noise.

In FIG. 1, the light made emergent from the semiconductor laser 1 (the wavelength of the laser beam is, for instance, 0.84 μm) is efficiently introduced into the waveguide portion 23 of the waveguide-type secondary harmonic oscillator 3 by means of the coupling lens 2. In addition, the light which is made incident, as described above, is split into two light beams B1, B2 having different wavelengths.

Figure 5:
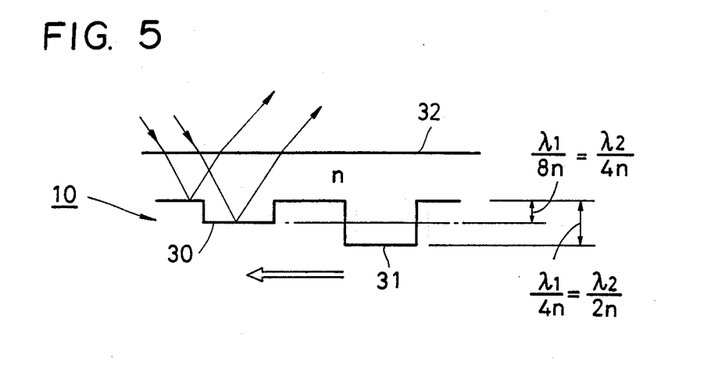
FIGS. 5 to 7 are schematic diagrams illustrating the basic principle of reproducing information in accordance with the present invention.

Accordingly, the light beams follow two different paths in a subsequent portion of the optical system. First, the light beam B1, which is of the original wavelength, passes through the half mirror 5, and is then converted into parallel beams of light by the collimator lens 7. Afterwards, the parallel beams of light are reflected by the reflective mirror 8 and are converged into a very small spot on, for instance, the optical disk 10, which is a medium on which signals have been recorded. Pits of two different depths, which constitute a characteristic feature of the present invention, have been recorded on the disk, as shown in FIG. 5. The converged beams are converted into reflected beams that are modulated in accordance with a basic principle, which will be described later, and in correspondence with the depth of the pits and their presence or absence, follow a return optical path, and are introduced into the photodetector 13 by means of the half mirror 5.

Figure 3A:
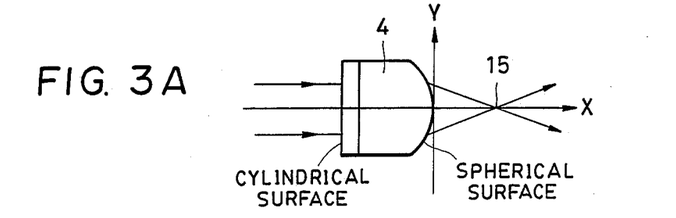
FIGS. 3A and 3B are, respectively, schematic diagrams of an optical device, as viewed from different directions, for modifying the configuration of the light beam shown in FIG. 1.
Figure 3B:
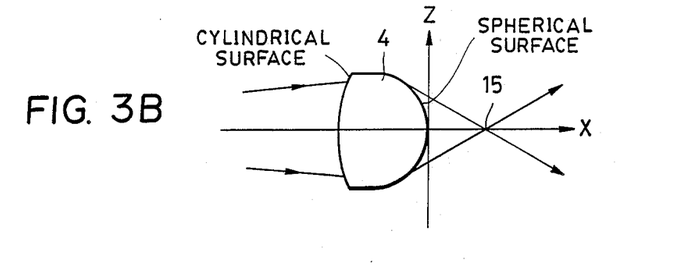

Meanwhile, the light beam B2 which is generated as the secondary harmonic is made emergent as a parallel beam of light as viewed in the direction of a horizontal cross-section of the secondary harmonic oscillator 3, and as a divergent beam of light as viewed in the direction of a longitudinal vertical cross section of the secondary harmonic oscillator 3. Consequently, after a cylindrical lens effect is imparted to the light beam B2 by the optical device 4 to convert the same into a parallel beam of light, an ordinary condenser lens effect is imparted to the light beam B2 so as to cause the same to be focused temporarily at the point 15. FIGS. 3A and 3B illustrate an example of such an optical device. FIGS. 3A and 3B are, respectively, views of the optical device 4 from predetermined directions along the Y and Z axes shown in FIG. 1. In the drawings, the optical device 4 has such a lens configuration that a cylindrical surface is formed on the side of the secondary harmonic oscillator 3 and a spherical surface is formed on the side of the focal point 15.

Subsequently, the light beam B2 passes through the collimator lens 7 as light diverging from the focal point 15, and after it is reflected by the reflective mirror 8, it is condensed onto the recording medium 10 by the objective lens 9. The reason why the light beam B2 is focused at this point, as described above, is that, in the case of a lens system made of a material such as ordinary glass or plastic, its refractive index varies with respect to two kinds of light waves whose wavelengths substantially differ. If the focal points of the different beams are disposed at conjugate positions which differ in accordance with the wavelength, these beams can be condensed into the same plane of the medium.

The light beam B2, after being condensed, is modulated and reflected in the same way as the light beam B1, follows the return optical path, and is introduced into the photodetector 14 by means of the half mirror 6.

Figure 4:
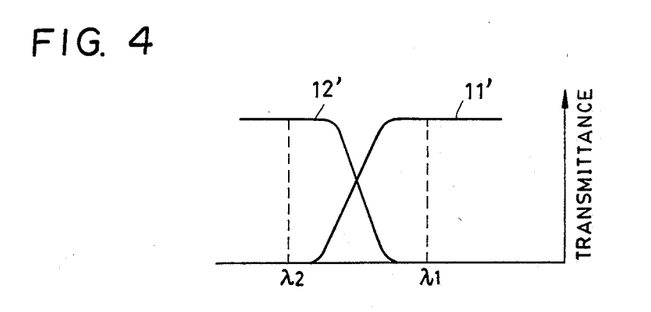
FIG. 4 is a characteristic diagram of an optical filter for eliminating unwanted light which would otherwise be incident upon a photodetector shown in FIG. 1.

In addition, the photodetectors 13, 14 subject the signals modulated in accordance with the different wavelengths and pits to photoelectric conversion and serve to electrically access these signals as reproduction signals. As described above, the optical filters 11, 12, respectively, function to prevent the light beam B2 from becoming mixed into the light incident upon the photodetector 13 and the light beam B1 from becoming mixed into the light incident upon the photodetector 14. Their representative characteristics are shown in FIG. 4. In FIG. 4, reference numerals 11', 12' respectively denote the transmittance of the optical filters 11, 12.

The reason why the semiconductor laser and the waveguide-type optical secondary harmonic oscillator 3, which is optically coupled with the laser, are used as the means for obtaining two beams having different wavelengths is that a continuous wave is generally input to an oscillating driver regarding a laser which is a light source, and therefore, if two independent light sources are used instead of the present method being applied, two drivers are naturally needed, which is wasteful. In addition, it is preferable for one wavelength to be an integral multiple of the other, and in the case of a semiconductor laser or the like, it is very difficult to obtain two, of which, one emits light with a wavelength exactly twice that of the other, and the problem of the signal-to-noise ratio of the signal becoming deteriorated also results during reproduction.

A description will now be given of a method of reproducing optical information and of an optical information recording medium in accordance with the present invention.

Figure 6:
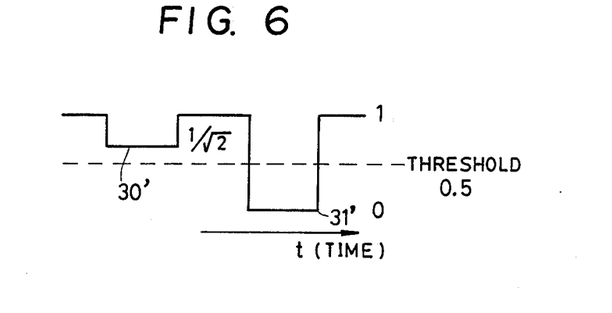
Figure 7:
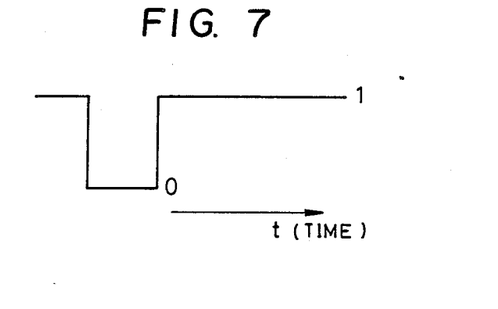

FIGS. 5 to 7 are diagrams illustrating the method of reproducing optical information (the basic principle of reading signals) in accordance with the present invention.

The optical information recording medium of the present invention is arranged such that pits 30, 31 having two different depths, as shown in FIG. 5, are recorded on the medium 10 and are covered uniformly with a transparent protective layer 32 having a refractive index n. Incidentally, it is assumed that the recording medium 10 and the light beams move relatively, resulting in motion in the direction of the arrow.

A case is first considered where the light beam B1 having a wavelength $\lambda_1$ irradiates the pits 30, 31 as a spot of light.

The depths of pits 30 and 31 are selected in accordance with the relationship between the wavelengths of beams $B_1$ and $B_2$. In this embodiment, the depth of the pit 30 is $\lambda_1/8n$, and the optical path difference between the light reflected from outside the pit and the light reflected from inside the pit is $\lambda_1/4n$. If the intensity of the light reflected from outside the pit is assumed to be 1, the light reflected from the pit 30 is provided with an intensity of $1/\sqrt{2}$ due to the interference of these two waves. On the other hand, the depth of the pit 31 is $\lambda_1/4n$, and the aforementioned optical path difference becomes $\lambda_1/2n$. If the interference is taken into consideration, the intensity of the reflected light from pit 31 becomes 0. Accordingly, the signals output from the photodetector 13 become as the ones shown in FIG. 6, where 30' denotes the signal from pit 30 and 31' denotes the signal from pit 31. If a threshold is set in the vicinity of 0.5 with maximum and minimum values, respectively, set to 1 and 0, and if the signal is sliced on the basis of this threshold, output signals with respect to the pits 30 and 31 are, respectively, detected as being 1 and 0.

In the case of the light beam B2 having a wavelength $\lambda_2$, the depth of the pit 30 is $\lambda_2/4n$, the optical path difference is $\lambda_2/2n$, and the intensity of the reflected light is 0. Meanwhile, the depth of the pit 31 is $\lambda_2/2n$, the optical path difference is $\lambda_2/n$, and the intensity of the reflected light is 1. Accordingly, these output signals from the photodetector 14 become as the ones shown in FIG. 7.

Thus, the pit 30 and the pit 31, respectively, go undetected by the photodetectors 14 and 13, as if they did not exist, with the result that it becomes possible to simultaneously process the recorded signals of two systems.

Various methods of recording information signals on a recording medium are conceivable on the basis of the above-described technique. As a simple example, however, there is one in which the pits 30 and 31 are arranged alternately at fixed intervals therebetween.

Figure 8:
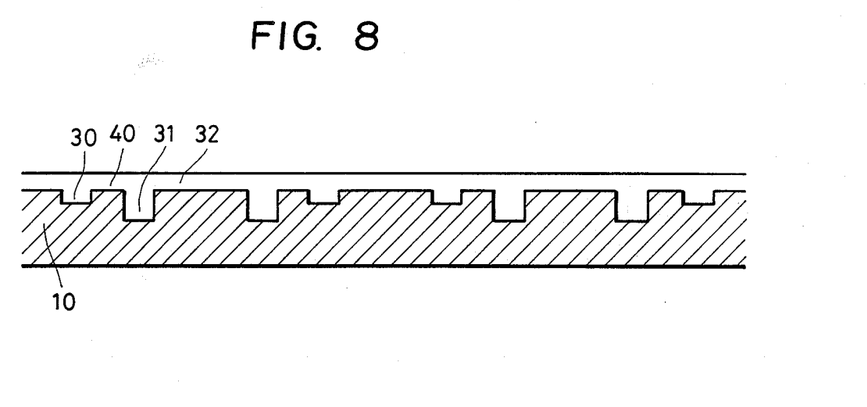
FIG. 8 is a schematic cross-sectional view of an embodiment of an optical recording medium in accordance with the present invention; an FIGS. 9 and 10 are, respectively, perspective and cross-sectional views of another embodiment of the optical recording medium in accordance with the present invention.

FIG. 8 shows a cross-sectional view of a recording medium on which information has been recorded by such a method. Incidentally, in this drawing, the portions corresponding to those in FIG. 5 are denoted by the same reference numerals. Reference numeral 40 denotes an interval between the pits 30 and 31. As pits whose optical depths vary in accordance with the two kinds of signals formed on a single track, it is possible to separately read the signals in the form of "1, 1, 0, 1, 1, 0, ..." in the case of the light beam B1 and "1, 0, 1, 1, 0, 1, ..." in the case of the light beam B2. In this case, the respective beams may irradiate an identical spot simultaneously, and it is also possible to allow scanning to be carried out with a time lag.

Figure 9:
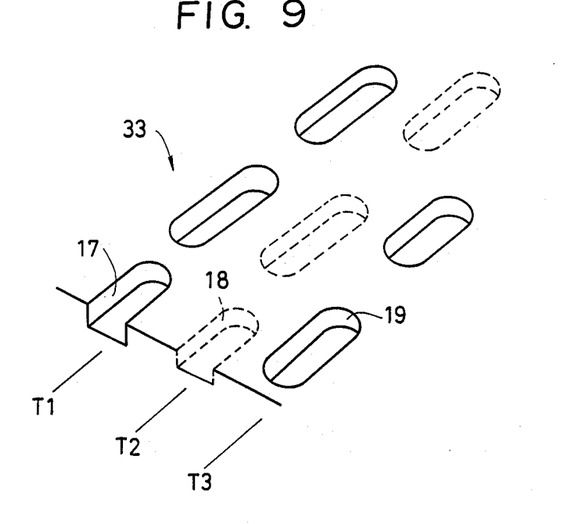
Figure 10:
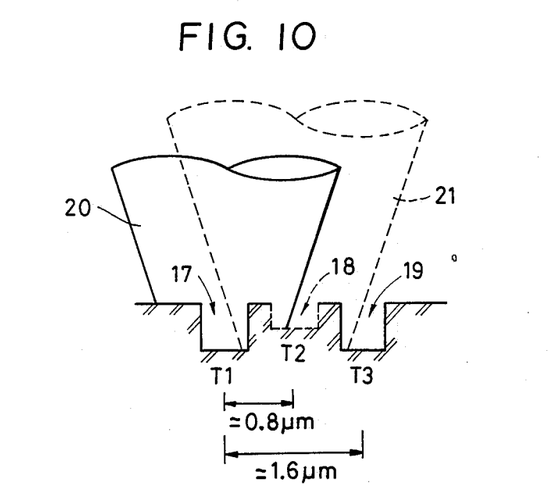

With respect to a method of reproducing information and an information recording medium in accordance with the present invention, another embodiment is shown in FIGS. 9 and 10.

FIG. 9 is a perspective view of two kinds of recording pits formed on a recording medium, while FIG. 10 is a cross-sectional view thereof. In the drawings, numerals 17, 18, and 19 denote pits, which are respectively provided on tracks T1, T2, and T3. The pits 17 and 19 are set to the same depth as that of the pit 31, while the depth of the pit 18 is set to the same depth as that of the pit 30. In other words, this means that tracks which are provided with pits of two different kinds shown in FIG. 5 are arranged alternately.

These pits 17, 18, and 19 are formed as portions recessed from a plane 33. All the regions separating these pits lie in the same plane. In other words, these pits have closed contours with respect to the plane 33. This also applies to the pits 30, 31 in the embodiment shown in FIG. 8.

The condensed light beams, B1, B2 of two wavelengths are arranged with their optical axes aligned with the centers of the tracks T1, T2 containing the pits 17, 18.

The interval between the pits 17 and 19 is, for instance, 1.6 $\mu$m, and this interval is the same as the interval between adjacent tracks on a known compact disk. In contrast to this, the interval between the pits 17 and 18 is set to 0.8 $\mu$m or thereabouts, which is approximately one half the aforementioned 1.6 $\mu$m. In this case, although the diameter of the spot of the condensed light is very small, as in the case of beams 20, 21 shown in FIG. 10, part of the beam 20 is applied to the pit 18 on the track T2, while part of the beam 21 is applied to the pits 17, 19 on the tracks T1, T3. Consequently, this would normally result in disturbing noise or crosstalk: however, in the present invention, the wavelength of the beam 20 is $\lambda_1$, and the level of noise occurring as a result of the part of the beam 20 being applied to the pit 18 on the track T2 can be eliminated by providing the threshold mentioned previously.

In addition, since the wavelength of the beam 21 is $\lambda_2$, the level of noise occurring as a result of part of the beam 21 being applied to the pits 17, 19 on the tracks T1, T3 is 0 in terms of the basic principle.

As is apparent from the foregoing description, the density of the tracks becomes double in this embodiment, so that a greater amount of information can be recorded.

The present invention is not restricted to the above-described embodiments, and various modifications and applications are possible.

For instance, in the example of a method of reproduction shown in FIG. 5, as two beams having two wavelengths with a wavelength ratio of 2:1 are applied to tracks in which rows of two kinds of pits whose depth ratio is 2:1 are formed, it is possible to reproduce two systems of signals simultaneously from the same medium. As a result, it is possible to obtain the advantages that the band of recording signals can be widened, and the recording density can be doubled. Accordingly, it is apparent that pits having three or more different depths may be formed to allow information to be reproduced for each type of pit. In this case, it is desirable that the threshold level of each signal be appropriately adjusted, so that different kinds of signals will not be mixed during reproduction of the signals.

What is claimed is:

1. A method of reproducing information by irradiating with a light beam an optical recording medium in which information has been recorded in the form of pits and by detecting a light beam modulated by the pits, comprising the steps of:

providing at least first and second pits removed from the same plane of the medium, the first and second pits independently representing information, the first pit having a first depth and the second pit having a second depth, the first depth differing from the second depth;

irradiating the medium with at least first and second light beams having different wavelengths respectively corresponding to the depths of the first and second pits; and independently detecting the first and second beams modulated by the first and second pits.

2. A method of reproducing information according to claim 1, wherein, when the wavelength of a certain light beam is $\lambda$ and the refractive index of a medium on one of the first and second pits is n, the depth of the one of the first and second pits corresponding thereto is $\lambda/4n$.

3. A method of reproducing information according to claim 1, wherein the second pit is formed at a depth half that of the first pit.

4. An apparatus for reproducing information from an optical information recording medium which has at least first and second pits formed on the same plane, each pit independently representing information, and the first pit having a first depth and the second pit having a second depth, the first depth differing from the second depth said apparatus comprising:

means for irradiating the medium with at least first and second light beams having different wavelengths respectively corresponding to the depths of the first and second pits; and at least first and second photodetectors for independently detecting the first and second light beams modulated by the first and second pits.

5. An apparatus according to claim 4, wherein, when the wavelength of a certain light beam is $\lambda$ and the refractive index of a medium on one of the first and second pits is n, the depth of the one of the first and second pits corresponding thereto is $\lambda/4n$.

6. An apparatus according to claim 5, wherein said irradiating means is adapted to irradiate the medium with the first beam having a wavelength $\lambda_1$ and the second beam having a wavelength $\lambda_2$ which is half $\lambda_1$, and the first and second pits respectively have depths of $\lambda_1/4n$ and $\lambda_1/8n$.

7. An apparatus according to claim 6 wherein said irradiating means comprises a light source for emitting a light beam with a wavelength $\lambda_1$, and a secondary harmonic oscillator for generating the first and second light beams out of the light beam.

8. An apparatus according to claim 7, wherein said irradiating means further comprises a lens system for condensing said first and second light beams onto the medium as a very small spot, and optical means for temporarily focusing the second light beam alone after it emerges from the secondary harmonic oscillator and for subsequently leading said second light beam into the lens system.

9. An apparatus according to claim 4 further comprising a plurality of optical filters associated with said plurality of photodetectors, for eliminating light other than that having the wavelength to be detected by said photodetectors.

* * * * *

UNITED STATES PATENT AND TRADEMARK OFFICE
CERTIFICATE OF CORRECTION

PATENT NO. : 4,963,464

DATED : October 16, 1990

INVENTOR(S) : Michitaka Setani

It is certified that error appears in the above-identified patent and that said Letters Patent is hereby corrected as shown below: TITLE PAGE:

IN THE ABSTRACT OF THE DISCLOSURE

Line 16, "irridating device" should read --irradiating device--.

COLUMN 1

Line 22, "recesses called pits" should read --recesses, called pits,--; and
Line 55, "Accordingly" should read --Accordingly,--.

COLUMN 2

Line 40, "an" should read --and--; and
Line 60, "source," should read --source, while--.

COLUMN 6

Line 38, "lengths" should read --lengths,--.

UNITED STATES PATENT AND TRADEMARK OFFICE
CERTIFICATE OF CORRECTION

PATENT NO. : 4,963,464

DATED : October 16, 1990

INVENTOR(S) : Michitaka Setani

It is certified that error appears in the above-identified patent and that said Letters Patent is hereby corrected as shown below:

COLUMN 8

Line 7, "depth" should read --depth,--;
    Line 33, "said first" should read --the first--;
    Line 36, "the" should read --said--; and
    Line 37, "said second" should read --the second-- and "into the" should read --into said--.

Signed and Sealed this

Twenty-eighth Day of July, 1992

Attest:

DOUGLAS B. COMER

*Attesting Officer*    *Acting Commissioner of Patents and Trademarks*